US011945218B2

(12) United States Patent
Kobayashi

(10) Patent No.: US 11,945,218 B2
(45) Date of Patent: Apr. 2, 2024

(54) PRINTING APPARATUS

(71) Applicant: SEIKO EPSON CORPORATION, Tokyo (JP)

(72) Inventor: Takehiro Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 415 days.

(21) Appl. No.: 17/003,329

(22) Filed: Aug. 26, 2020

(65) Prior Publication Data

US 2021/0060986 A1 Mar. 4, 2021

(30) Foreign Application Priority Data

Aug. 29, 2019 (JP) ................................ 2019-157150

(51) Int. Cl.
*B41J 15/04* (2006.01)
*B65H 16/02* (2006.01)
*B65H 23/038* (2006.01)

(52) U.S. Cl.
CPC ............ *B41J 15/046* (2013.01); *B65H 16/02* (2013.01); *B65H 23/038* (2013.01); *B65H 2301/413* (2013.01); *B65H 2511/12* (2013.01); *B65H 2801/12* (2013.01)

(58) Field of Classification Search
CPC ........ B41J 15/46; B65H 16/02; B65H 23/038; B65H 2301/413; B65H 2511/12; B65H 2801/12
See application file for complete search history.

(56) References Cited

U.S. PATENT DOCUMENTS

2004/0140387 A1* 7/2004 Ishida .................... B65H 23/10 242/417.3
2008/0173750 A1* 7/2008 Takeuchi ............... B41J 15/042 242/564.1
2011/0063391 A1* 3/2011 Miyamoto ............ B65H 23/16 242/566
2013/0216292 A1* 8/2013 Yokoyama ......... B65H 35/0006 400/613
2016/0039229 A1* 2/2016 Zhang .................. B65H 23/048 242/615.3
2017/0106681 A1* 4/2017 Blom ..................... B65H 29/52

FOREIGN PATENT DOCUMENTS

JP 05-077993 3/1993
JP 2005-239374 9/2005

* cited by examiner

*Primary Examiner* — David H Banh
(74) *Attorney, Agent, or Firm* — WORKMAN NYDEGGER

(57) ABSTRACT

A printing apparatus includes: a roll paper container portion that accommodates roll paper formed into a roll by wrapping recording paper around a core; a transportation roller that transports the recording paper in a transportation direction; a buffering member that moves in contact with the recording paper; and a guide member that is provided upstream of the buffering member in the transportation direction and guides the core of the roll paper that is moved from an inside of the roll paper container portion to an outside.

7 Claims, 6 Drawing Sheets

PRINTING APPARATUS

The present application is based on, and claims priority from JP Application Serial Number 2019-157150, filed Aug. 29, 2019, the disclosure of which is hereby incorporated by reference herein in its entirety.

BACKGROUND

1. Technical Field

The present disclosure relates to a printing apparatus.

2. Related Art

As disclosed in JP-A-2005-239374, a printing apparatus that transports recording paper from a paper roll and records a recording target image on the recording paper has been developed. The printing apparatus disclosed in JP-A-2005-239374 is provided with a buffering member for reducing an inertial load that is generated when the recording paper is transported from the paper roll. Reducing the inertial load increases the stability of feeding the paper from the roll. Recently, for the purpose of reducing the size of a printing apparatus, increasing its speed, and avoiding the direction of paper ejection from being limited to one direction only, a printing apparatus that includes a buffering member assembled using snap-fit assembly has been developed.

In the printing apparatus described above, a user takes out the core of roll paper left in the roll paper container portion of the printing apparatus with the hands when the roll paper needs to be replaced. However, in the printing apparatus described above, the core sometimes gets caught on the buffering member or in the neighborhood of the buffering member when the core of the roll paper is taken out of the roll paper container portion manually by the user. It is often troublesome for the user to take out the core. This is especially true when the size of the printing apparatus is small.

SUMMARY

A printing apparatus according to a certain aspect includes: a roll paper container portion configured to accommodate roll paper formed into a roll by wrapping recording paper around a core; a transportation roller configured to transport the recording paper in a transportation direction; and a buffering member configured to buffer an inertial load received from the recording paper by moving in contact with the recording paper transported by the transportation roller, wherein the buffering member includes a guide member guiding the core of the roll paper that is moved from an inside of the roll paper container portion to an outside along a wall surface of the roll paper container portion.

DESCRIPTION OF EXEMPLARY EMBODIMENTS

With reference to the accompanying drawings, an exemplary embodiment of the present disclosure will now be explained.

Overall Structure of Printing Apparatus

Figure 1:
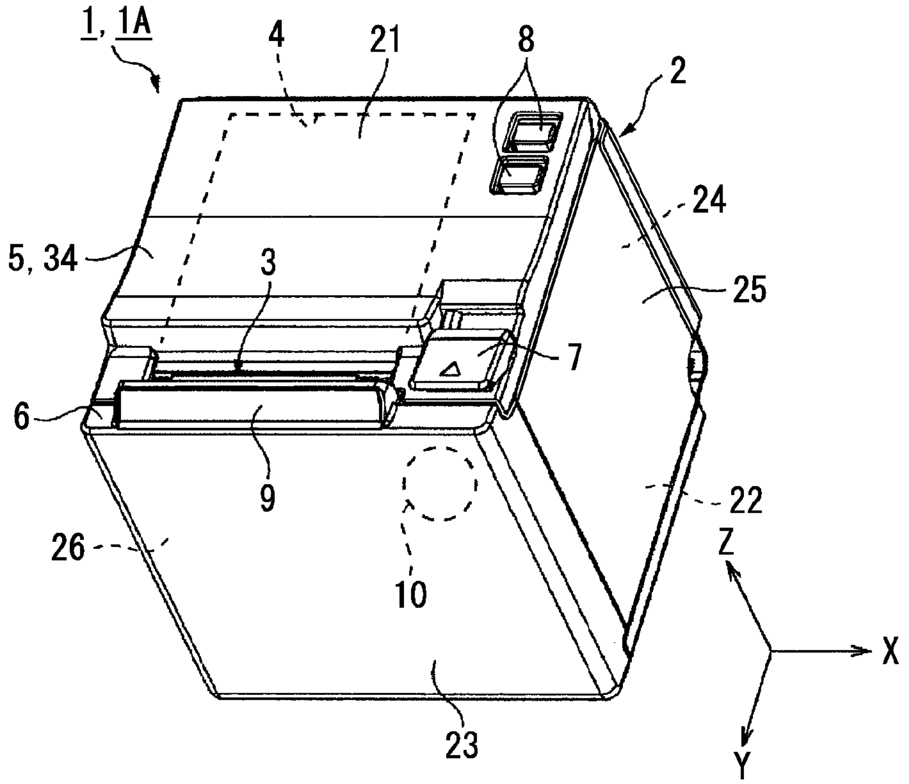
FIG. 1 is an external perspective view of an example of an installation orientation of a printing apparatus according to an exemplary embodiment.
Figure 2:
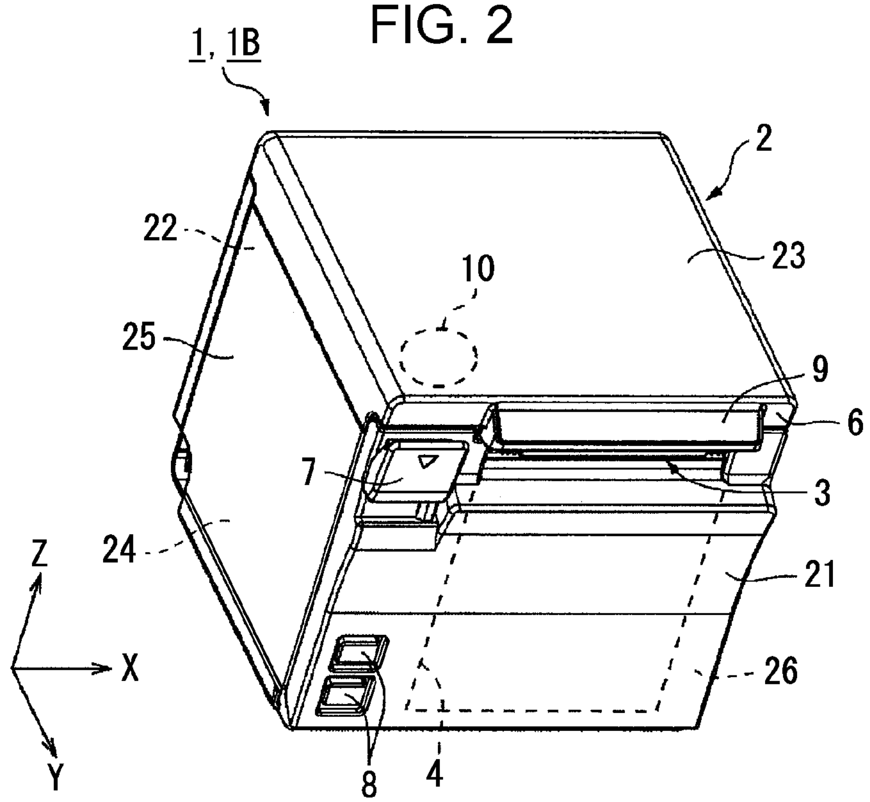
FIG. 2 is an external perspective view of another example of an installation orientation of the printing apparatus according to the exemplary embodiment.
Figure 3:
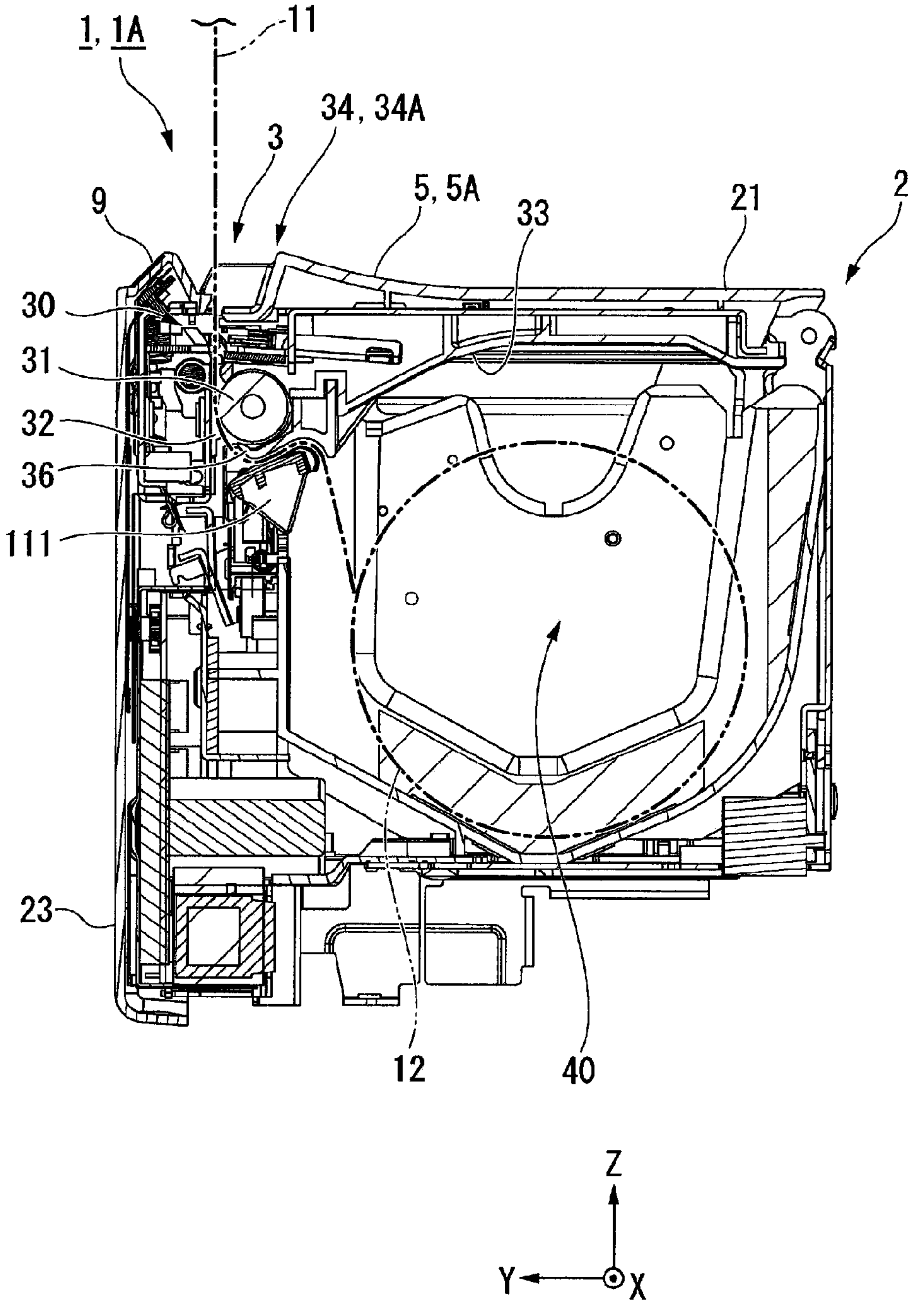
FIG. 3 is a longitudinal sectional view of the inner structure of the printing apparatus according to the exemplary embodiment in a closed position.
Figure 4:
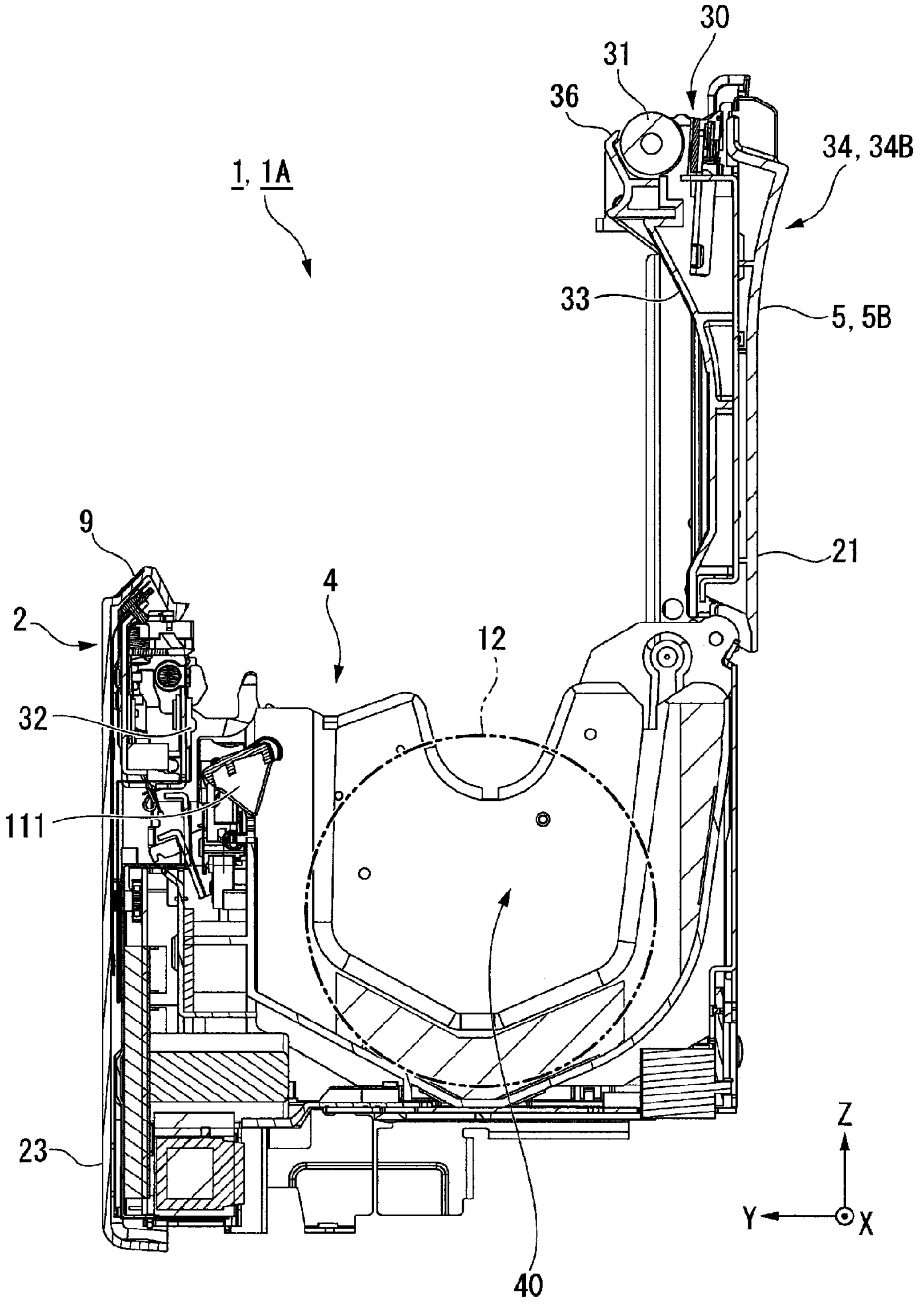
FIG. 4 is a longitudinal sectional view of the inner structure of the printing apparatus according to the exemplary embodiment in an open position.

FIG. 1 is an external perspective view of an example of an installation orientation of a printing apparatus 1 according to an exemplary embodiment. FIG. 2 is an external perspective view of another example of an installation orientation of the printing apparatus 1 according to the exemplary embodiment. The installation orientation depicted by the example in FIG. 2 is different from the installation orientation depicted by the example in FIG. 1. The description in the exemplary embodiment will be given mainly with reference to the installation orientation illustrated in FIG. 1. FIG. 3 is a longitudinal sectional view of the inner structure of the printing apparatus 1 according to the exemplary embodiment in a closed position. FIG. 4 is a longitudinal sectional view of the inner structure of the printing apparatus 1 according to the exemplary embodiment in an open position. In the longitudinal sectional views of the printing apparatus 1 in FIGS. 3 and 4, the printing apparatus 1 is in a state of the installation orientation illustrated in FIG. 1. In FIGS. 3 and 4, a second face 22 and a fourth face 24 are not illustrated.

To facilitate an explanation, the X axis, the Y axis, and the Z axis are shown as three-dimensional coordinate axes orthogonal to one another in each of FIGS. 1 to 4. On each axis, the direction indicated by an arrow is a positive direction, and the opposite direction is a negative direction. The positive direction may be referred to as a + direction. The negative direction may be referred to as a − direction. In the exemplary embodiment, the −Z direction is assumed as a vertically downward direction corresponding to the direction of gravity, and the +Z direction is assumed as a vertically upward direction.

Roll paper 12, which is long recording paper 11 formed into a roll, is loaded into the printing apparatus 1 according to the exemplary embodiment. The printing apparatus 1 prints a print target image onto the recording paper 11 reeled out from the roll paper 12.

The printing apparatus 1 includes a case 2, which has a shape of a rectangular parallelepiped as a whole. The case 2 has a first face 21, on which a recording paper ejection port 3 is formed. The case 2 has a second face 22, a third face 23, a fourth face 24, a fifth face 25, and a sixth face 26. In the example illustrated in FIG. 1, as an example of a state of use of the printing apparatus 1, the printing apparatus 1 is installed such that the second face 22 of the case 2 is oriented parallel to an X-Y plane, which is a horizontal plane. In the exemplary embodiment, in order to facilitate an explanation, the orientation of the printing apparatus 1 in this state of use is referred to as a first installation orientation 1A. The first installation orientation 1A is an example of a first orientation. In the example illustrated in FIG. 2, as another example of a state of use of the printing apparatus 1, the printing apparatus 1 is installed such that the fourth face 24 of the case 2 is oriented parallel to an X-Y plane, which is a horizontal plane. In the exemplary embodiment, in order to facilitate an explanation, the orientation of the printing apparatus 1 in this state of use is referred to as a second installation orientation 1B. The second installation orientation 1B is an example of a second orientation.

In the first installation orientation 1A illustrated in FIG. 1, the first face 21 is oriented in the +Z direction, which is the vertically upward direction, and the recording paper ejection port 3 is located along the +Y directional edge, which is the front edge, of the first face 21. As described above, in the first installation orientation 1A, the printing apparatus 1 is installed such that the recording paper ejection port 3 is located along the front edge of the top face of the case 2. In this example, the front edge is the proximal edge as viewed from a user. In the first installation orientation 1A, the case 2 has the second face 22 that is the −Z directional face meaning the bottom face, the third face 23 that is the +Y directional face meaning the front face, the fourth face 24 that is the −Y directional face meaning the back face, the fifth face 25 that is the +X directional face meaning one of the lateral faces in the width direction, and the sixth face 26 that is the −X directional face meaning the other of the lateral faces in the width direction.

A rectangular roll paper loading inlet 4 for putting the roll paper 12 in, and taking the roll paper 12 out, etc. is provided in the first face 21 of the case 2. An open/close lid 5, by which the roll paper loading inlet 4 is configured to be covered, and a front edge portion 6, which extends along the +Y directional edge of the roll paper loading inlet 4, are provided on the first face 21. The open/close lid may be referred to as an open/close cover. The open/close lid 5 is able to move between a closed position 5A illustrated in FIG. 3 and an open position 5B illustrated in FIG. 4, the latter of which is an erect position in the +Z direction, by pivoting on the −Y directional edge portion at the rear edge of the open/close lid 5 illustrated therein. In other words, the open/close lid 5 is able to pivot on the −Y directional edge portion from the closed position 5A to the open position 5B, wherein the open position 5B is a position at which the open/close lid 5 is upright in the +Z direction. When the open/close lid 5 is at the closed position 5A, the recording paper ejection port 3, which has a shape of a slit extending in the X direction, is located between the open/close lid 5 and the front edge portion 6. The open/close lid 5 includes an open/close lever 7 provided at a +X directional position that is one side in the width direction of the recording paper ejection port 3. When a user puts the user's fingers on the open/close lever 7 and pulls it upward, a lock is released. Unlocking enables the user to open the open/close lid 5 upward. The lock is not illustrated.

An operation portion 8 such as a power switch and the like is provided at a −Y directional corner that is the rear portion of the open/close lid 5. The front edge portion 6 of the first face 21 has a sloped surface that is inclined obliquely upward from the front. A display unit 9 is provided on the sloped surface. The sloped surface is oriented in a direction defined by the +Y direction and the +Z direction. The display unit 9 displays various kinds of information such as the operation status of the printing apparatus 1. The display unit 9 extends along the top edge of the third face 23 continuous from the first face 21. At a position near the top edge of the third face 23, an NFC communication unit 10, which reads information without any contact from an NFC (Near Field Communication) chip mounted in a portable terminal, etc. hand-held by a user, is provided at the +X directional side that is one side in the width direction of the third face 23. The printing apparatus 1 according to the exemplary embodiment is able to perform printing based on the information read by the NFC communication unit 10.

Two Installation Orientations of Printing Apparatus

In the second installation orientation 1B illustrated in FIG. 2, the first face 21 of the printing apparatus 1 is oriented in the +Y direction, which is the direction toward the front, and the recording paper ejection port 3 is located on the front face of the printing apparatus 1. In the second installation orientation 1B, the second face 22 is the −Y directional face meaning the back face, the third face 23 is the +Z directional face meaning the top face, the fourth face 24 is the −Z directional face meaning the bottom face, the sixth face 26 is the +X directional face meaning one of the lateral faces in the width direction, and the fifth face 25 is the −X directional face meaning the other of the lateral faces in the width direction.

When the printing apparatus 1 is installed in the first installation orientation 1A illustrated in FIG. 1, all of the recording paper ejection port 3, the display unit 9, and the NFC communication unit 10 are located in a concentrated manner near the angled portion connecting the top face and the front face to each other. That is, all of the recording paper ejection port 3, the display unit 9, and the NFC communication unit 10 are located in a concentrated manner at positions that are near the user and are therefore easily accessible. Also when the printing apparatus 1 is installed in the second installation orientation 1B illustrated in FIG. 2, all of the recording paper ejection port 3, the display unit 9, and the NFC communication unit 10 are located in a concentrated manner near the angled portion connecting the top face and the front face to each other.

In the first installation orientation 1A illustrated in FIG. 1, the first face 21 having the recording paper ejection port 3 is the top face, and it is possible to eject the recording paper 11 from the top face in the +Z direction, that is, upward, after completion of printing. In the second installation orientation 1B illustrated in FIG. 2, the first face 21 having the recording paper ejection port 3 is the front face, and it is possible to eject the recording paper 11 from the front face in the +Y direction, that is, frontward, after completion of printing. As explained above, the printing apparatus 1 can be installed with a choice of an output direction of the recording paper 11 between two directions, that is, upward or frontward, depending on the environment of the installation site. Regardless of which one of the two installation orientations the printing apparatus 1 is installed in, the ease of operation will not be impaired.

In the first installation orientation 1A illustrated in FIG. 1, the open/close lid 5 pivots on the rear edge portion to open upward in the +Z direction, and an opening of the roll paper loading inlet 4 appears upward. Therefore, a user doing replacement work of the roll paper 12 takes the roll paper 12 out through the top and puts the roll paper 12 in through the top. In the second installation orientation 1B illustrated in FIG. 2, the open/close lid 5 pivots on the lower edge portion to open frontward in the +Y direction. The opening of the roll paper loading inlet 4 appears frontward. Therefore, a user doing replacement work of the roll paper 12 takes the roll paper 12 out through the front and puts the roll paper 12 in through the front. As explained above, regardless of which one of the first installation orientation 1A and the second installation orientation 1B the printing apparatus 1 is installed in, the user is able to do the replacement work of the roll paper 12 easily.

Inner Structure of Printing Apparatus

A recording paper cutting mechanism 30 configured to cut the recording paper 11 near the recording paper ejection port 3 is provided inside the case 2 illustrated in FIG. 3. A platen roller 31 and a print head 32 are provided below the recording paper cutting mechanism 30. In other words, the platen roller 31 and the print head 32 are provided upstream of the recording paper cutting mechanism 30 in a direction in which the recording paper 11 is transported. The platen roller 31 is mounted on a platen support frame 33 configured to support the back of the open/close lid 5 from the −Z directional side. Mechanical components including the open/close lid 5, the recording paper cutting mechanism 30, and the platen support frame 33, etc. constitute an open/close lid unit 34, which is opened and closed integrally with the platen support frame 33. The open/close lid 5 is located at the closed position 5A when the open/close lid unit 34 is located at a closed position 34A. The open/close lid 5 is located at the open position 5B when the open/close lid unit 34 is located at an open position 34B.

A roll paper container portion (a roll holder) 40 is provided below the open/close lid unit 34 illustrated in FIG. 3. The roll paper container portion 40 accommodates (holds) the roll paper 12. The center part of the roll paper container portion 40 in the Y direction is recessed in the −Z direction, and the recessed part faces the roll paper loading inlet 4 of the first face 21. As illustrated in FIG. 4, opening the open/close lid unit 34 makes it possible to put the roll paper 12 into the roll paper container portion 40 through the roll paper loading inlet 4 and take the roll paper 12 out of the roll paper container portion 40 through the roll paper loading inlet 4. The roll paper 12 put in through the roll paper loading inlet 4 is held on the bottom part of the roll paper container portion 40 in a rotatable state.

The +Y directional end that is the front end of the roll paper container portion 40 extends upward in the +Z direction. A buffering member 111 configured to buffer an inertial load received from the recording paper 11 is provided over the top of the end of the roll paper container portion 40. The recording paper 11 reeled out from the roll paper 12 passes along the buffering member 111 and is thereafter stretched on a paper guide portion 36, which is provided on the lower end of the platen support frame 33. The recording paper 11 is set to pass through the clearance between the platen roller 31 and the print head 32 and go via the recording paper cutting mechanism 30 upward out of the case 2 through the recording paper ejection port 3.

The transportation path leading via the buffering member 111 and the paper guide portion 36 is curved to have an upward convex shape.

Structure of Buffering Member

Figure 5:
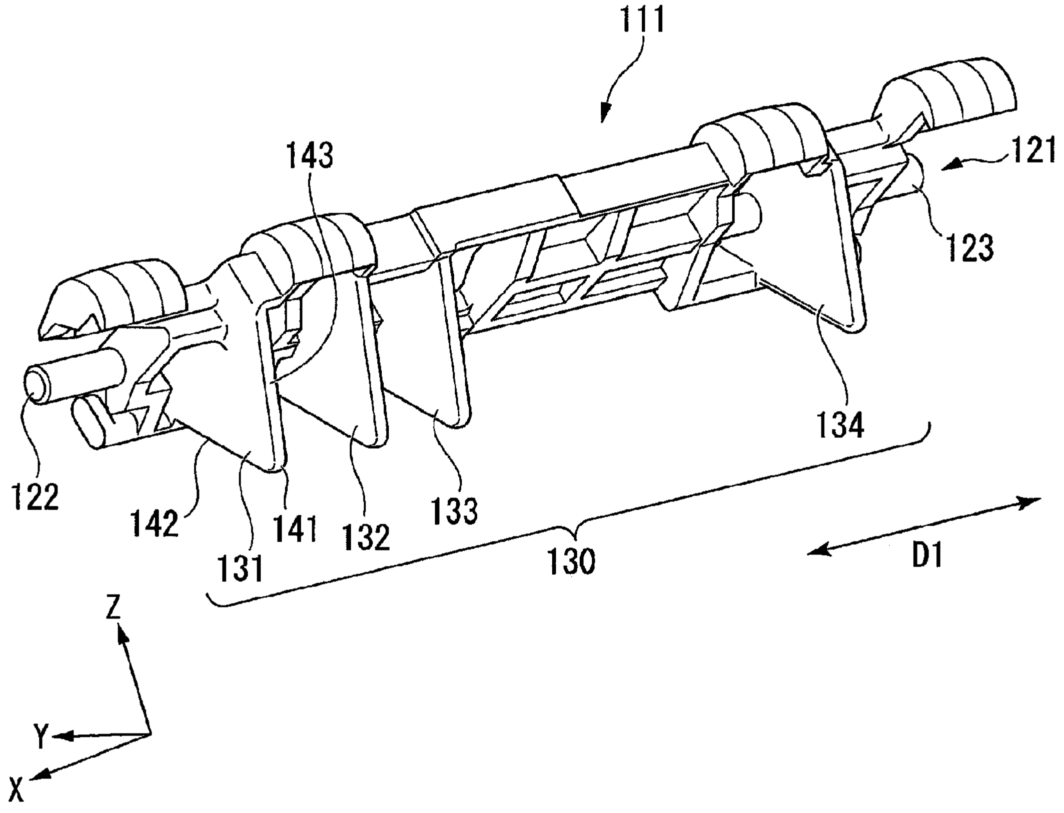
FIG. 5 is an external perspective view of a buffering member according to the exemplary embodiment.

The printing apparatus 1 according to the exemplary embodiment includes the buffering member 111. With reference to FIGS. 5 to 8, the buffering member 111 will now be explained. FIG. 5 is an external perspective view of the buffering member 111 according to the exemplary embodiment. In the example illustrated in FIGS. 5 to 8, the printing apparatus 1 is in a state of the installation orientation 1A illustrated in FIG. 1. To facilitate an explanation, similarly to the example illustrated in FIG. 1, the X axis, the Y axis, and the Z axis are shown as three-dimensional coordinate axes orthogonal to one another in each of FIGS. 5 to 8.

The buffering member 111 includes a body member 121 and a guide member 130. The body member 121 is a member that has a shape of a substantially flat plate. In the exemplary embodiment, in order to simplify the description, an explanation of the details of the shape of the body member 121 is omitted, and the body member 121 is explained as a member that has a shape of a substantially flat plate. The detailed shape of the body member 121 is illustrated in FIG. 5.

In the example illustrated in FIG. 5, the body member 121 has a shape extending in a direction parallel to the X axis. The body member 121 includes a first shaft member 122, which has a portion protruding from the +X directional end in the +X direction, and a second shaft member 123, which has a portion protruding from the −X directional end in the −X direction. Although the first shaft member 122 and the second shaft member 123 are configured separately from each other in the exemplary embodiment, they are present on a straight line. The axial direction of the first shaft member 122 and the axial direction of the second shaft member 123 are the same as each other. The axial direction D1 of the first shaft member 122 and the second shaft member 123 is illustrated in FIG. 5. In the example illustrated in FIG. 5, the axial direction D1 is parallel to the X axis.

The shape of the body member 121 may be, for example, the same as or similar to the overall shape of a buffering member of related art. The buffering member 111 buffers an inertial load received from the recording paper 11 when the recording paper 11 is transported from the roll paper 12.

The buffering member 111 according to the exemplary embodiment includes the guide member 130 in addition to the body member 121. In the exemplary embodiment, the guide member 130 includes four ribs, which are a first rib 131, a second rib 132, a third rib 133, and a fourth rib 134.

In the example illustrated in FIG. 5, the first rib 131, the second rib 132, the third rib 133, and the fourth rib 134 are provided from the end on which the first shaft member 122 is provided toward the end on which the second shaft member 123 is provided in the buffering member 111. Three ribs, specifically, the first rib 131, the second rib 132, and the third rib 133, are provided on the side where the first shaft member 122 is provided, and one rib, specifically, the fourth rib 134, is provided on the side where the second shaft member 123 is provided. In other words, the interval between the third rib 133 and the fourth rib 134 is greater than each of the interval between the first rib 131 and the second rib 132 and the interval between the second rib 132 and the third rib 133.

In the exemplary embodiment, the four first to fourth ribs 131 to 134 have the same shape as one another. The shape is a flat plate-like shape having triangular faces. The four first to fourth ribs 131 to 134 are provided such that the triangular faces are perpendicular to the axial direction D1 respectively.

In the exemplary embodiment, the four first to fourth ribs 131 to 134 are provided such that the orientation of the triangular faces with respect to the axial direction D1 is identical. Each of the first rib 131 to the fourth rib 134 is provided such that one vertex 141 of the triangle projects from the body member 121 in substantially the same direction. Each of the first rib 131 to the fourth rib 134 projects from the buffering member 111 toward the roll paper container portion 40. In FIG. 5, two sides 142 and 143 sharing the one vertex 141 of the triangle are illustrated. To simplify the illustration, in the example illustrated in FIG. 5, the vertex of the first rib 131 is labeled with the reference numeral 141, and the sides thereof are labeled with the reference numerals 142 and 143, and labeling for the other ribs is omitted. However, the above description and labeling applies also to the second rib 132, the third rib 133, and the fourth rib 134.

In the present embodiment, in order to simplify the description, the shape of each of the first rib 131 to the fourth rib 134 is explained as a triangle. However, the shape may be, for example, a shape that is similar to a triangle. The sides 142 and 143 may be referred to as, for example, oblique sides.

Each of the first rib 131 to the fourth rib 134 has elasticity with regard to rotation in a predetermined direction around the first shaft member 122 and the second shaft member 123 as the center axis. The elasticity may be, for example, elasticity using a spring. In the buffering member 111 according to the exemplary embodiment, the body member 121 is integral with the first rib 131 to the fourth rib 134. The buffering member 111 as a whole has elasticity with regard to rotation in a predetermined direction around the first shaft member 122 and the second shaft member 123 as the center axis. As another example, one or more of the first rib 131 to the fourth rib 134 provided on the body member 121 may be configured to be movable in relation to the body member 121 of the buffering member 111.

Figure 6:
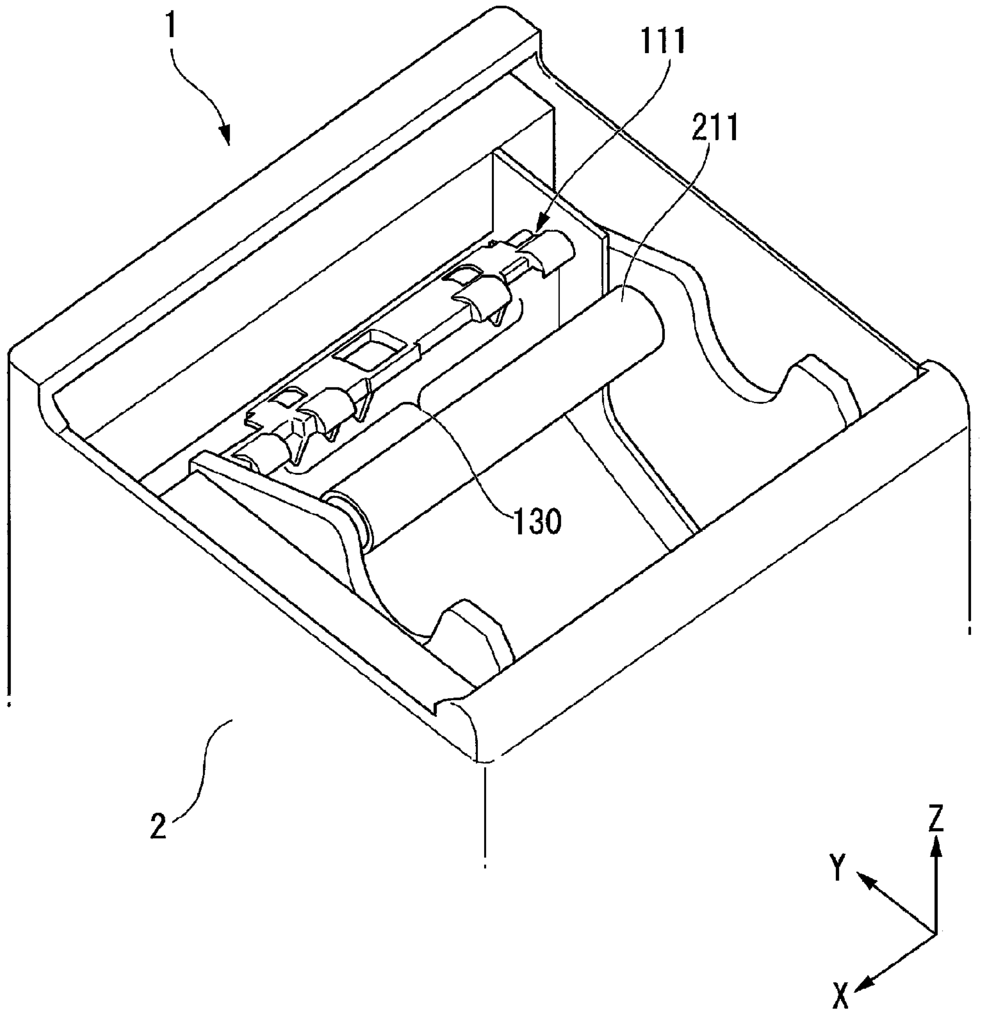
FIG. 6 is an external perspective view illustrating the layout of the buffering member including a guide member inside the printing apparatus according to the exemplary embodiment.

FIG. 6 is an external perspective view illustrating the layout of the buffering member 111 including the guide member 130 inside the printing apparatus 1 according to the exemplary embodiment. An example of a core 211 of the roll paper 12 is also illustrated in FIG. 6. The core 211 of the roll paper 12 illustrated in FIG. 6 is a mere example. The size of the core 211 may be various sizes. For example, if the core 211 has a cylindrical or columnar shape, the diameter of the circle may be various diameters, and the length of the cylinder or the column may be various lengths.

The guide member 130 is provided at an upstream part of the buffering member 111 in the transportation direction of the recording paper 11. In a state of non-rotation of the buffering member 111, the four first to fourth ribs 131 to 134 of the guide member 130 have sides respectively along the transportation direction of the recording paper 11. In the exemplary embodiment, the side described here is one side 143 located at the side where the recording paper 11 is present.

The upstream in the transportation direction of the recording paper 11 means the source side in the direction in which the recording paper 11 is transported, that is, the side that is closer to the roll paper 12 from which the recording paper 11 is reeled out. The downstream in the transportation direction of the recording paper 11 means the destination side in the direction in which the recording paper 11 is transported, that is, the side that is farther from the roll paper 12 from which the recording paper 11 is reeled out. In the exemplary embodiment, each of the first rib 131 to the fourth rib 134 is provided at a position occupying a part of the upstream of the buffering member 111.

In the exemplary embodiment, the guide member 130 guides the core 211 of the roll paper 12 that is moved from the inside of the roll paper container portion 40 to the outside along the wall surface of the roll paper container portion 40. For example, when the core 211 of the roll paper 12 left inside the roll paper container portion 40 is taken out by the user with the hands, the core 211 is guided by one or more of the four first to fourth ribs 131 to 134 of the guide member 130.

In the printing apparatus 1 according to the exemplary embodiment, the roll paper container portion 40 is able to accommodate plural kinds of the roll paper 12 different from one another in terms of width. The four first to fourth ribs 131 to 134 of the guide member 130 are provided at intervals corresponding to the widths of the plural kinds of the roll paper 12. For example, regardless of which one of the plural kinds of the roll paper 12 is contained, at least one of the four first to fourth ribs 131 to 134 is configured to face the core 211 when the core 211 is taken out from the inside to the outside of the roll paper container portion 40.

In the exemplary embodiment, each of the first rib 131 to the fourth rib 134 is provided at a position that does not allow fingers of a person to go into a movable space of the buffering member 111 when the fingers are put into the inside of the printing apparatus 1. Because of this structure, for example, the person is able to take out the core 211 of the roll paper 12 smoothly with the fingers from the inside to the outside of the printing apparatus 1.

Figure 7:
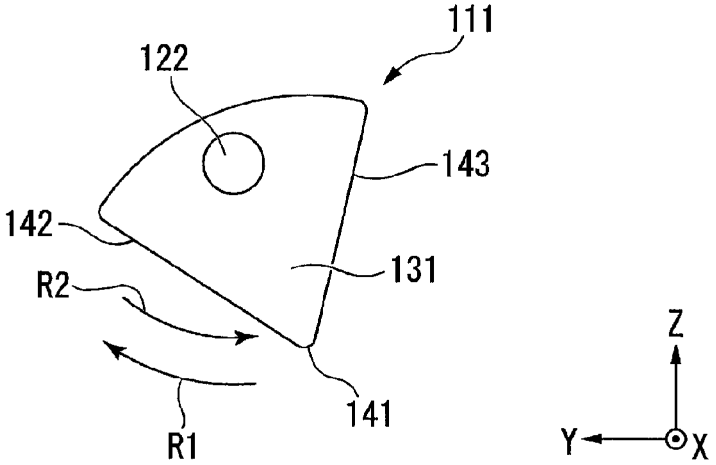
FIG. 7 is a diagram that illustrates that the buffering member according to the exemplary embodiment is located at one end of a movable range.
Figure 8:
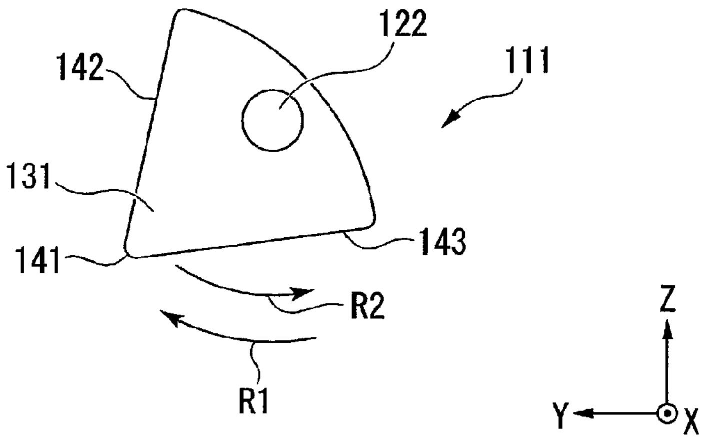
FIG. 8 is a diagram that illustrates that the buffering member according to the exemplary embodiment is located at the other end of the movable range.

FIG. 7 is a diagram that illustrates that the buffering member 111 according to the exemplary embodiment is located at one end of a movable range. FIG. 8 is a diagram that illustrates that the buffering member 111 according to the exemplary embodiment is located at the other end of the movable range. In the exemplary embodiment, the movement illustrated in these figures is movement by rotation. In FIGS. 7 and 8, the first rib 131 and the first shaft member 122 of the buffering member 111 illustrated in FIG. 5 are illustrated as viewed in the direction from +X toward −X. In the example illustrated in FIGS. 7 and 8, the first rib 131 has a triangular shape. However, in the exemplary embodiment, the first rib 131 is formed integrally as a part of the buffering member 111 and, therefore, parts other than the two sides 142 and 143, which are formed integrally, are schematically depicted as a curve.

In the exemplary embodiment, the buffering member 111 is able to rotate in a predetermined angular range around the first shaft member 122 and the second shaft member 123 extending in the X direction as the center axis. Together with the rotation of the buffering member 111, the first to fourth ribs 131 to 134 also rotate by the same angle.

With regard to a state of the buffering member 111 when an external force is not applied to the buffering member 111 in a first rotation direction R1, the position of the first rib 131 is illustrated in FIG. 7. In this state, the first rib 131 and the buffering member 111 including the first rib 131 are able to rotate by a predetermined angle in the first rotation direction R1 around the first shaft member 122 and the second shaft member 123 as the center axis. In this state, the first rib 131 and the buffering member 111 including the first rib 131 are located at the maximum end position in a second rotation direction R2, which is the opposite of the first rotation direction R1, and therefore cannot rotate any farther.

The external force applied to the buffering member 111 means a force that is applied to the buffering member 111 by, for example, the recording paper 11, the hand of a person, or the like. A force applied to the buffering member 111 by any of parts of the printing apparatus 1 under normal conditions of use is not included. An example of such parts is a spring provided for the buffering member 111. In the exemplary embodiment, a force is applied to the buffering member 111 by the spring in the second rotation direction R2, which is the opposite of the first rotation direction R1. Because of this urging force, the buffering member 111 is usually located at the maximum end position in the second rotation direction R2, which is the opposite of the first rotation direction R1. When an external force is applied to the buffering member 111 in the first rotation direction R1, if the magnitude of the external force is greater than the magnitude of the force of the spring, the buffering member 111 rotates in the first rotation direction R1 by an angle that depends on the magnitude of the external force.

With regard to a state of the buffering member 111 when an external force is applied to the buffering member 111 in the first rotation direction R1, the position of the first rib 131 is illustrated in FIG. 8. In this state, the first rib 131 and the buffering member 111 including the first rib 131 are able to rotate by a predetermined angle in the second rotation direction R2 around the first shaft member 122 and the second shaft member 123 as the center axis. In the example illustrated in FIG. 8, the first rib 131 and the buffering member 111 including the first rib 131 are located at the maximum end position in the first rotation direction R1, which is the opposite of the second rotation direction R2, and therefore cannot rotate any farther.

Receiving the force applied externally, the first rib 131 and the buffering member 111 including the first rib 131 are able to be put into a position of a certain rotation angle that is between the rotation angle in the state illustrated in FIG. 7 and the rotation angle in the state illustrated in FIG. 8. In the exemplary embodiment, in order to facilitate an explanation, a space between the position of the body member 121 of the buffering member 111 in the state illustrated in FIG. 7 and the position of the body member 121 of the buffering member 111 in the state illustrated in FIG. 8 is referred to as a movable space of the buffering member 111.

In the exemplary embodiment, each of the first rib 131 to the fourth rib 134 is provided at a position of not coming into contact with the recording paper 11 when the recording paper 11 is transported from the roll paper 12. In the exemplary embodiment, in order to achieve this, a triangular shape is used as an example of the shape of each of the first rib 131 to the fourth rib 134. In addition, in the exemplary embodiment, each of the first rib 131 to the fourth rib 134 is provided at a position occupying a part of the movable space of the buffering member 111. As described above, in the exemplary embodiment, the guide member 130 is provided at a position of not coming into contact with the recording paper 11 that is being transported from the roll paper 12 and occupying a part of the movable space of the buffering member 111.

Remarks about Exemplary Embodiment

As explained above, the printing apparatus 1 according to the exemplary embodiment includes the roll paper container portion 40, the platen roller 31, which is an example of a transportation roller, and the buffering member 111. The roll paper container portion 40 accommodates the roll paper 12 that is a roll of the recording paper 11. The platen roller 31 transports the recording paper 11 in a predetermined transportation direction. The transportation direction is, for example, a direction designed in advance. The buffering member 111 moves in contact with the recording paper 11 transported in the transportation direction. The printing apparatus 1 according to the exemplary embodiment includes the guide member 130. The guide member 130 is provided at an upstream part of the buffering member 111 in the transportation direction of the recording paper 11 and guides the core 211 of the roll paper 12 that is moved from the inside of the roll paper container portion 40 to the outside.

Therefore, the printing apparatus 1 according to the exemplary embodiment enhances the ease of operation by a user when, for example, the user takes out the core 211 of the roll paper 12 with the hands from the inside of the printing apparatus 1 to the outside. This makes it easier to take out the core 211 of the roll paper 12 from the inside of the printing apparatus 1 to the outside. Moreover, in the printing apparatus 1 according to the exemplary embodiment, the guide member 130 improves paper feed stability.

In the printing apparatus 1 according to the exemplary embodiment, the guide member 130 includes the first rib 131 to the fourth rib 134, each of which is a rib that has the side 143 along the transportation direction of the recording paper 11.

In the printing apparatus 1 according to the exemplary embodiment, since each of the first rib 131 to the fourth rib 134 has the side 143 along the transportation direction of the recording paper 11, for example, they are not obstructive to the transportation of the recording paper 11.

The printing apparatus 1 according to the exemplary embodiment is able to accommodate plural kinds of the roll paper 12 different from one another in terms of width. That is, the printing apparatus 1 is able to accommodate at least two kinds of the roll paper 12 such as the roll paper 12 that is comparatively wide and the roll paper 12 that is comparatively narrow. The printing apparatus 1 may be able to accommodate three or more kinds of the roll paper 12. The guide member 130 the first rib 131 to the fourth rib 134 as an example of a plurality of ribs provided at intervals corresponding to widths of the roll paper 12.

Therefore, the printing apparatus 1 according to the exemplary embodiment enhances the ease of operation by a user when, for example, the user takes out the core 211 of each kind of the roll paper 12 with the hands from the inside of the printing apparatus 1 to the outside, even when it is possible to accommodate plural kinds of the roll paper 12 different from one another in terms of width.

The printing apparatus 1 according to the exemplary embodiment is able to perform printing in the first installation orientation 1A, which is an example of a first orientation, and the second installation orientation 1B, which is an example of a second orientation different from the first orientation.

Therefore, the printing apparatus 1 according to the exemplary embodiment enhances the ease of operation by a user when, for example, the user takes out the core 211 of the roll paper 12 with the hands from the inside of the printing apparatus 1 to the outside, even when it is possible to perform printing in different orientations.

In related art, for example, when roll paper is set by a user, a slack in the circumferential part of the roll sometimes gets caught in a movable space of a buffering member according to related art, resulting in a decrease in paper feed stability. Moreover, in related art, for example, the core of the roll sometimes gets caught in the movable space of the buffering member according to related art at the time of roll paper replacement due to poor user operability. Therefore, the buffering member according to related art sometimes comes out of joint.

By contrast, the printing apparatus 1 according to the exemplary embodiment offers all of high buffering performance of the buffering member 111, stable paper feed, and enhanced ease of operation by a user.

Although the number of ribs of the guide member 130 in the exemplary embodiment is four, the number may be, for example, one, or any number of two or more. When the guide member 130 includes a plurality of ribs, for example, the shape of the ribs may be the same as one another or different from one another. The shape of the rib of the guide member 130 may be any shape. The shape of the buffering member 111 may be any shape. A part or a whole of the guide member 130 may be integral with the housing of the printing apparatus 1 instead of being integral with the buffering member 111. The buffering member 111 includes the guide member 130 also in this case.

Although an exemplary embodiment of the present disclosure is explained in detail above with reference to the accompanying drawings, its specific structure is not limited to those described in the embodiment. The scope of the present disclosure encompasses design, etc. that is within a range not departing from the gist of the disclosure.

What is claimed is:

1. A printing apparatus, comprising:

a roll paper container portion configured to accommodate roll paper from which recording paper is wrapped around a core;

a transportation roller configured to transport the recording paper in a transportation direction; and a buffering member configured to buffer a load received from the recording paper by moving in contact with the recording paper transported by the transportation roller; and a guide member configured to guide the core of the roll paper that is moved from an inside of the roll paper container portion to an outside along a wall surface of the roll paper container portion, wherein the guide member also is configured to move together with the buffering member and not to contact the recording paper as the buffering member moves in contact with the recording paper, and wherein the guide member is further configured to rotate in one direction when force from the recording paper is applied to the buffering member.

2. The printing apparatus according to claim 1, wherein the guide member includes a rib that has a side along the transportation direction.

3. The printing apparatus according to claim 2, wherein the roll paper container portion is configured to accommodate plural kinds of the roll paper different from one another in terms of width, and the guide member includes, as the rib, a plurality of ribs provided at intervals corresponding to widths of the roll paper.

4. The printing apparatus according to claim 1, wherein the printing apparatus is configured to perform printing in a first orientation and a second orientation different from the first orientation.

5. The printing apparatus according to claim 1, wherein the guide member is further configured to rotate in another direction opposite the one direction when force from the recording paper is not applied to the buffering member.

6. The printing apparatus according to claim 1, wherein the guide member is positioned at an upstream part of the buffering member in the transportation direction.

7. A printing apparatus, comprising:

a roll paper container portion configured to accommodate roll paper from which recording paper is wrapped around a core;

a transportation roller configured to transport the recording paper in a transportation direction; and a buffering member configured to buffer a load received from the recording paper by moving in contact with the recording paper transported by the transportation roller; and a guide member configured to guide the core of the roll paper that is moved from an inside of the roll paper container portion to an outside along a wall surface of the roll paper container portion, wherein the guide member also is configured to move together with the buffering member and not to contact the recording paper as the buffering member moves in contact with the recording paper, the guide member includes a rib that has a side along the transportation direction, the roll paper container portion is configured to accommodate plural kinds of the roll paper different from one another in terms of width, and the guide member includes, as the rib, a plurality of ribs provided at intervals corresponding to widths of the roll paper.

* * * * *